United States Patent
Nishimaki

(10) Patent No.: US 7,218,538 B2
(45) Date of Patent: May 15, 2007

(54) POWER SOURCE DEVICE

(75) Inventor: Tatsuo Nishimaki, Mutsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/994,214

(22) Filed: Nov. 19, 2004

(65) Prior Publication Data

US 2005/0168163 A1 Aug. 4, 2005

(30) Foreign Application Priority Data

Nov. 21, 2003 (JP) ............... 2003-392044

(51) Int. Cl.
*H02M 7/25* (2006.01)
(52) U.S. Cl. ............... 363/60; 363/89; 315/224
(58) Field of Classification Search .......... 363/59, 363/60, 34, 84, 78, 89, 37, 127; 307/125, 307/66, 85; 315/224, 307, 308, 291, 225, 315/219
See application file for complete search history.

(56) References Cited

U.S. PATENT DOCUMENTS

| | | | |
|---|---|---|---|
| 4,868,730 A * | 9/1989 | Ward | 363/60 |
| 6,153,949 A * | 11/2000 | Soderhall | 307/125 |
| 6,275,397 B1 * | 8/2001 | McClain | 363/89 |
| 6,587,006 B2 | 7/2003 | Kawajiri | 331/45 |
| 6,937,487 B1 * | 8/2005 | Bron | 363/60 |
| 6,979,960 B2 * | 12/2005 | Okawa et al. | 315/291 |

FOREIGN PATENT DOCUMENTS

| | | |
|---|---|---|
| JP | 05-064426 | 3/1993 |
| JP | 06-165484 | 6/1994 |
| JP | 06-311734 | 11/1994 |
| JP | 10-191625 | 7/1998 |
| JP | 2003-8404 | 1/2003 |
| JP | 2003-092873 | 3/2003 |

OTHER PUBLICATIONS

Communication from Japanese Patent Office regarding counterpart application.

* cited by examiner

*Primary Examiner*—Wilson Lee
(74) *Attorney, Agent, or Firm*—Harness, Dickey & Pierce, P.L.C.

(57) ABSTRACT

A power source device is provided including a boosting circuit for stepping-up an input voltage to a desired output voltage, a starter circuit for starting the boosting circuit in a starting period thereof, and a drive circuit for driving the boosting circuit as a substitute for the starter circuit after the output voltage of the boosting circuit becomes equal to or greater than a predetermined level. The starter circuit comprises a starter signal generation circuit for generating a starter signal which on/off controls a MOS transistor used for stepping-up in the boosting circuit, and a determining/controlling circuit which detects whether or not a monitor voltage in the boosting circuit is equal to or greater than a predetermined level while the MOS transistor is in the on-state, and inhibits outputting if the starter signal if the monitor voltage is equal to or greater than the predetermined level.

3 Claims, 8 Drawing Sheets

FIG.4
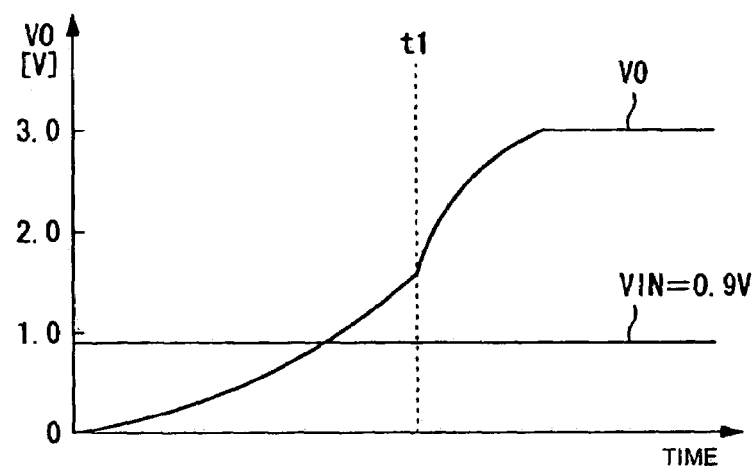
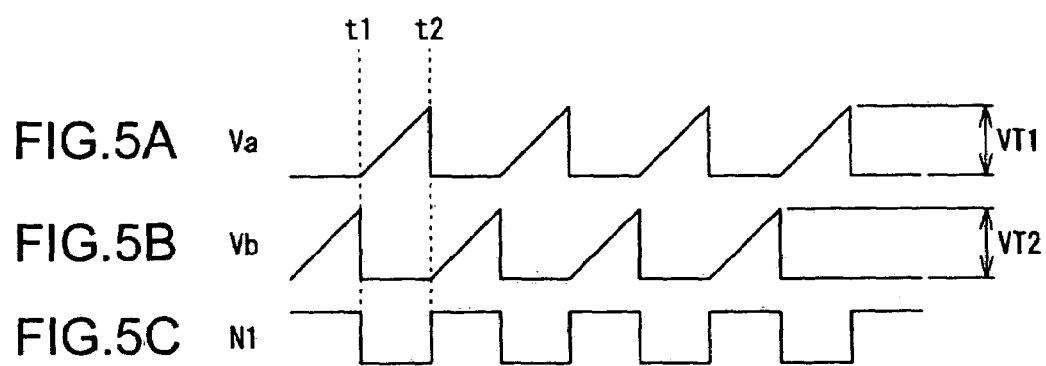
FIG.5A  Va
FIG.5B  Vb
FIG.5C  N1

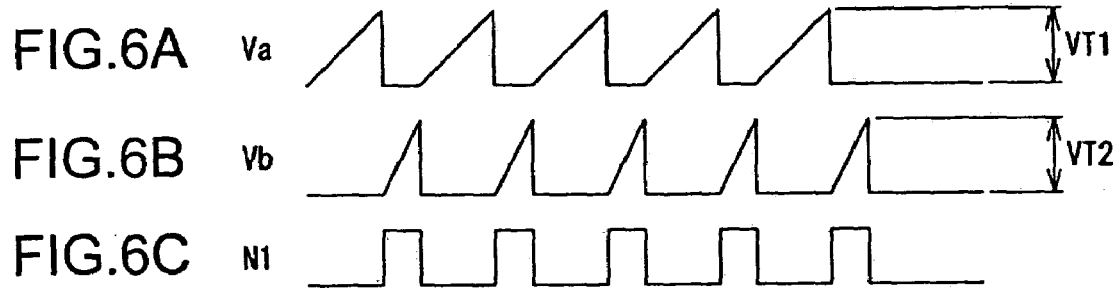
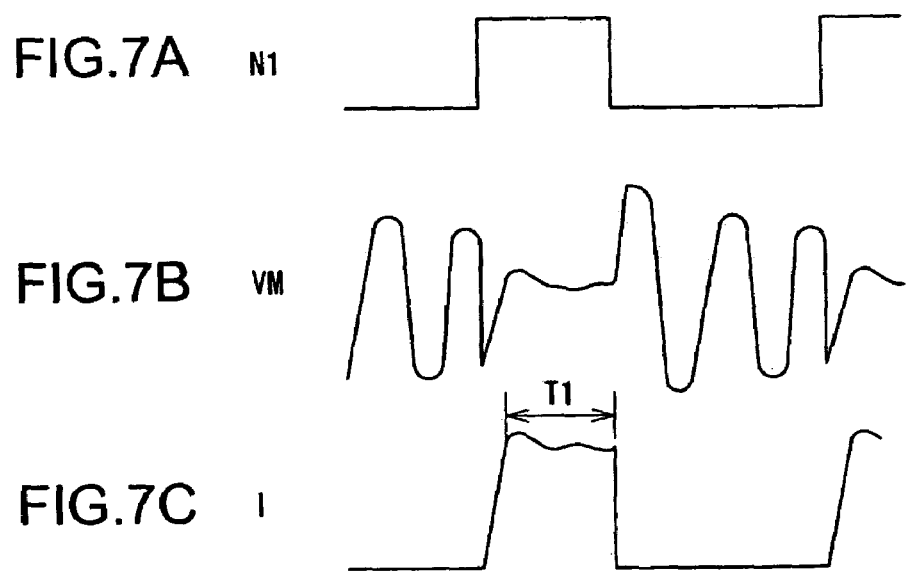

FIG.8A  N1 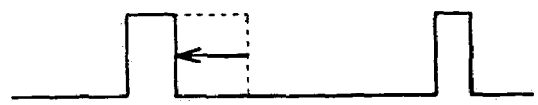
FIG.8B  VM 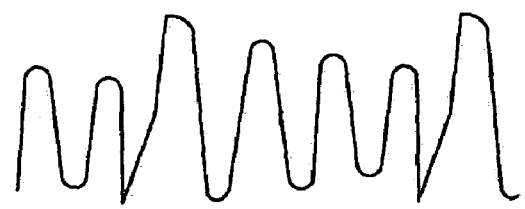
FIG.8C  I 
FIG.9A  Va 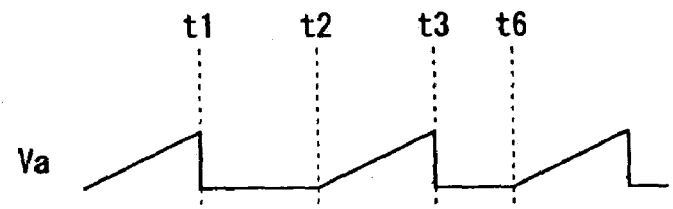
FIG.9B  Vb 
FIG.9C  N1 
FIG.9D  XN1 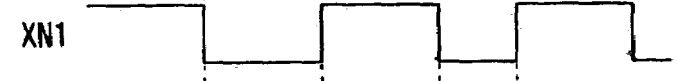
FIG.9E  VM 
FIG.9F  V3 

POWER SOURCE DEVICE

RELATED APPLICATIONS

This application claims priority to Japanese Patent Application No. 2003-392044 filed Nov. 21, 2003 which is hereby expressly incorporated by reference herein in its entirety.

BACKGROUND

1. Field of the Invention

The present invention relates to a power source device that controls output voltage by, for example, switching the input voltage to execute a boosting (step-up) operation.

2. Related Art

Known power source devices include boosting circuits for stepping-up input voltage to a desired output voltage by switching the input voltage, starter circuits for starting boosting circuits at the beginning of the operation of the boosting circuits, and drive circuits for driving the boosting circuits as substitutes for the starter circuits when the output voltage levels of the boosting circuits become equal to or greater than a predetermined level (See Japanese Unexamined Patent Publication No. 2003-92873, for example).

The starter circuits are arranged to generate clock signals with fixed frequencies, and transistors for performing the switching operations of the boosting circuits are on/off controlled using the clock signals (on/off signals).

However, in conventional power source devices, the clock signals generated in the starter circuits are constant. Accordingly, when the boosting circuit is in a starting period of an operation and triggered by starting the starter circuits, wasteful currents flow through the boosting circuits to problematically and wastefully consume electric power.

Further, in recent years switching frequencies have increased and the inductances of coil components have reduced (to smaller sizes) to reduce the size of mounting areas in power source devices used for portable devices such as mobile phones. Therefore, it has become difficult to increase output voltages without increasing the switching frequencies when starting operations from rather low voltages. However, if bipolar transistors are used for starting operations, the switching frequencies are problematically difficult to increase.

Accordingly, an object of the present invention is to provide a power source device capable of reducing power consumption by reducing the wasteful current flowing through the boosting circuit and of a high speed switching operation by a switching element of the boosting circuit even in a low voltage condition when the boosting circuit starts to operate.

SUMMARY

In order to address the above problems, the present invention is configured as follows.

Namely, a power source device according to a first aspect of the present invention comprises a boosting circuit for stepping-up an input voltage to a desired output voltage, a starter circuit for starting the operation of the boosting circuit in a starting period of the boosting circuit, and a drive circuit for driving the boosting circuit as a substitute for the starter circuit when the output voltage of the boosting circuit either reaches or exceeds a predetermined level, wherein the starter circuit is arranged to on/off control a switching element used for the boosting operation of the boosting circuit, and to determine whether or not a predetermined monitor voltage generated in the boosting circuit is either equal to or higher than a predetermined level, and to stop an on-operation of the switching element when the monitor voltage is either equal to or higher than the predetermined level.

A power source device according to a second aspect of the present invention comprises a boosting circuit for stepping-up an input voltage to a desired output voltage, a starter circuit for starting the boosting circuit in a starting period of the boosting circuit, and a drive circuit for driving the boosting circuit as a substitute for the starter circuit when the output voltage of the boosting circuit either reaches or exceeds a predetermined level, wherein the starter circuit comprises a starter signal generation circuit which generates a starter signal for on/off controlling a MOS transistor used for boosting operation of the boosting circuit, and a determining/controlling circuit which determines, while the MOS transistor is in an on-state, whether or not a monitor voltage at a common connection section of a coil and the MOS transistor in the boosting circuit is either equal to or higher than a predetermined level, and switches the MOS transistor to an off state if the monitor voltage is either equal to or higher than the predetermined level.

Regarding a power source device according to a third aspect of the present invention, in the power source device according to the second aspect, the starter signal generation circuit comprises two constant current circuits and two capacitors alternately charged by the respective constant current circuits, and the frequency of the starter signal is arranged to be controlled by altering constant current values of both constant current circuits, and a duty ratio of the starter signal is arranged to be controlled by altering the capacitances of both capacitors.

According to the present invention configured as described above, when the boosting circuit starts its operation, power consumption can be reduced by reducing the wasteful current consumption in the boosting circuit, and a high speed switching operation by a switching element of the boosting circuit can be realized even in a low voltage condition.

BRIEF DESCRIPTION OF THE DRAWINGS

FIG. 4 is a chart for explaining a brief summary of an operation of the embodiment.

FIGS. 5A through 5C are waveform charts for explaining an operation of a starter signal generation circuit in the starter circuit shown in FIG. 2 and showing waveform examples of principal parts.

FIGS. 6A through 6C are waveform charts for explaining an alternative operation of a starter signal generation circuit in the starter circuit shown in FIG. 2 and showing waveform examples of principal parts.

FIGS. 7A through 7C are waveform charts for explaining an operation of the boosting circuit shown in FIG. 1 using a conventional technique and showing waveform examples of various parts.

FIGS. 8A through 8C are waveform charts for explaining an operation of the boosting circuit shown in FIG. 1 using the present invention and corresponding to those shown in FIG. 7.

FIGS. 9A through 9F are waveform charts for explaining an operation of the starter circuit shown in FIG. 3 and showing waveform examples of principal parts.

DETAILED DESCRIPTION

Hereinafter, an embodiment of the present invention is described with reference to the accompanying drawings.

First, the overall configuration of the embodiment of the power source device according to the present invention is described with reference to FIG. 1.

Figure 1:
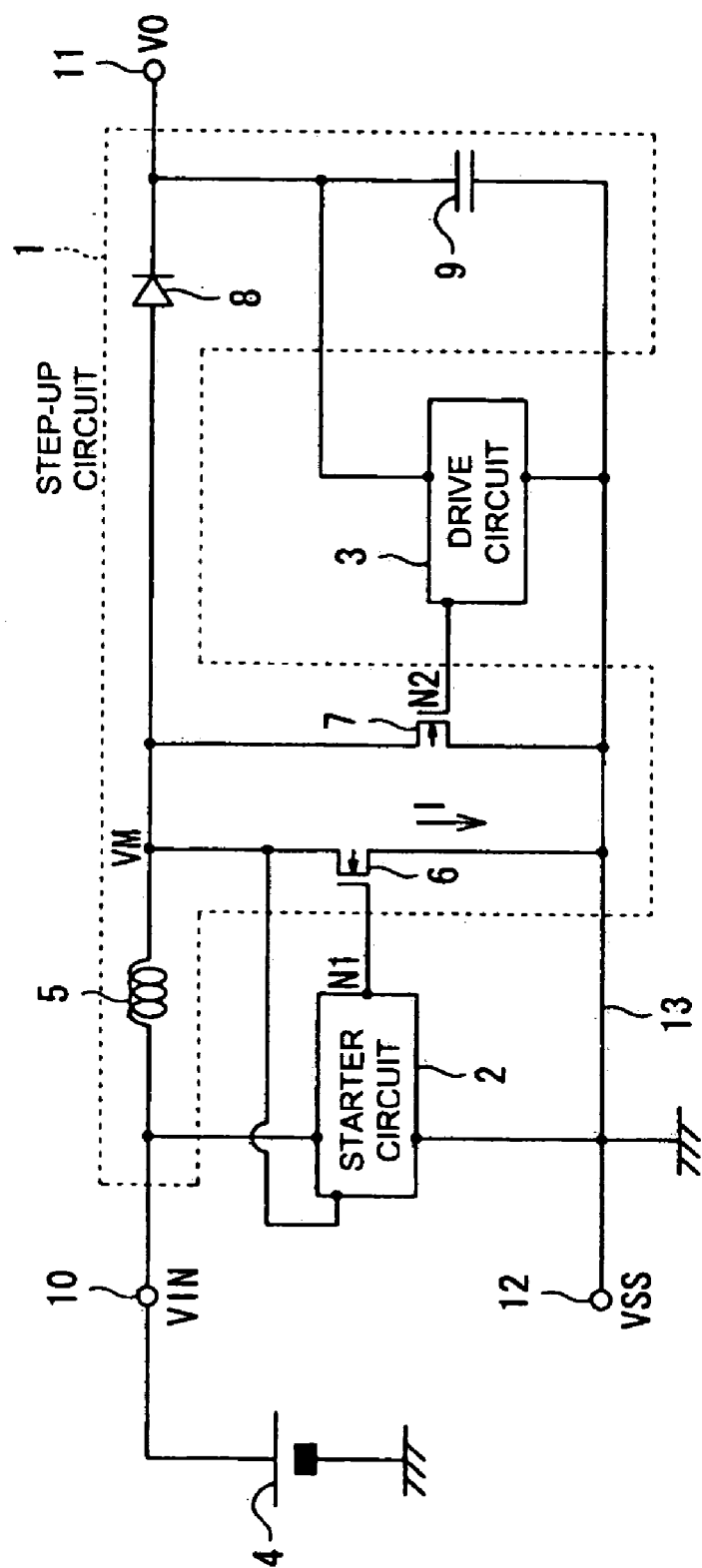
FIG. 1 is a circuit diagram showing an overall configuration of an embodiment of the present invention.

The power source device according to the present embodiment is arranged to be able to reduce power consumption by reducing wasteful current in a step-up or boosting circuit 1 at the start-up of the boosting circuit 1 shown in FIG. 1 as well as to perform a high frequency switching operation of a switching element equipped with the boosting circuit 1 even in a low voltage condition, and a starter circuit 2 is provided with these functions.

Accordingly, the power source device according to the present embodiment is, as shown in FIG. 1, equipped with the boosting circuit 1, the starter circuit 2, and a drive circuit 3.

The boosting circuit 1 is for stepping-up a direct current input voltage VIN from a direct current power source 4 to a desired output voltage VO through a switching operation executed on the input voltage VIN. The starter circuit 2 is for starting the boosting circuit 1 at the beginning of the operation of the boosting circuit 1. The drive circuit 3 is for driving the boosting circuit 1 as a substitute of the starter circuit 2 when the output voltage VO of the boosting circuit 1 becomes equal to or greater than a predetermined level (the drive circuit 3 replaces the starter circuit 2 after the output voltage VO reaches or exceeds a predetermined level). Note that the starter circuit 2 is arranged to operate in accordance with the input voltage VIN, while the drive circuit 3 is arranged to operate in accordance with the output voltage VO of the boosting circuit 1.

Hereinafter, a specific configuration of the boosting circuit 1 is described with reference to FIG. 1.

As shown in FIG. 1, the boosting circuit 1 is composed of a combination of a coil (inductor) 5, two N-type MOS transistors 6, 7 functioning as the switching element, a diode (Schottky diode) 8, and a smoothing capacitor 9.

In further detail, the coil 5 and the diode 8 are connected in series, with one end of this series circuit connected to an input terminal 10 and the other end thereof connected to an output terminal 11 thereof Further, the MOS transistor 6 is connected between a common connection point of the coil 5 and the diode 8 and a common connection line (a ground line) 13. Still further, the gate of the MOS transistor 6 receives a starter signal N1 from the starter circuit 2, thus the MOS transistor 6. is on/off controlled.

The MOS transistor 7 is connected between a common connection point of the coil 5 and the diode 8, and a common connection line 13. The gate of the MOS transistor 7 is applied with a drive signal N2 from the drive circuit 3, thus the MOS transistor 7 is on/off controlled. Further, one terminal of the capacitor 9 is connected to the output terminal 11, and the other terminal thereof is connected to the common connection line 13. The common connection line 13 is connected to a common connection terminal 12.

Hereinafter, a specific configuration of the starter circuit 2 is described with reference to FIG. 2.

The starter circuit 2 on/off controls the stepping-up MOS transistor 6 of the boosting circuit 1. When the starter circuit 2 is in the on-state, a predetermined monitor voltage generated in the boosting circuit 1 is determined to be (or not to be) equal to or greater than a predetermined level. If the monitor voltage is equal to or greater than the predetermined level, the switching operation of the MOS transistor 6 is stopped.

To achieve the above, the starter circuit 2 is composed of a starter signal generation circuit 20 for generating the starter signal N1 used for on/off controlling the MOS transistor 6 of the boosting circuit 1, a determining/controlling circuit 32 which determines whether or not the predetermined monitor voltage in the boosting circuit 1 is equal to or grater than the predetermined level when the MOS transistor 6 is in the on-state in the starting-up operation, and turns-off the starter signal N1 from the starter signal generation circuit 20 when the monitor voltage is equal to or grater than the predetermined level.

The starter signal generation circuit 20 is arranged to alternately charge and discharge capacitors 22 and 26, and to generate the desired starter signal N1 utilizing the charged voltages Va, Vb of both capacitors 22 and 26.

Figure 2:
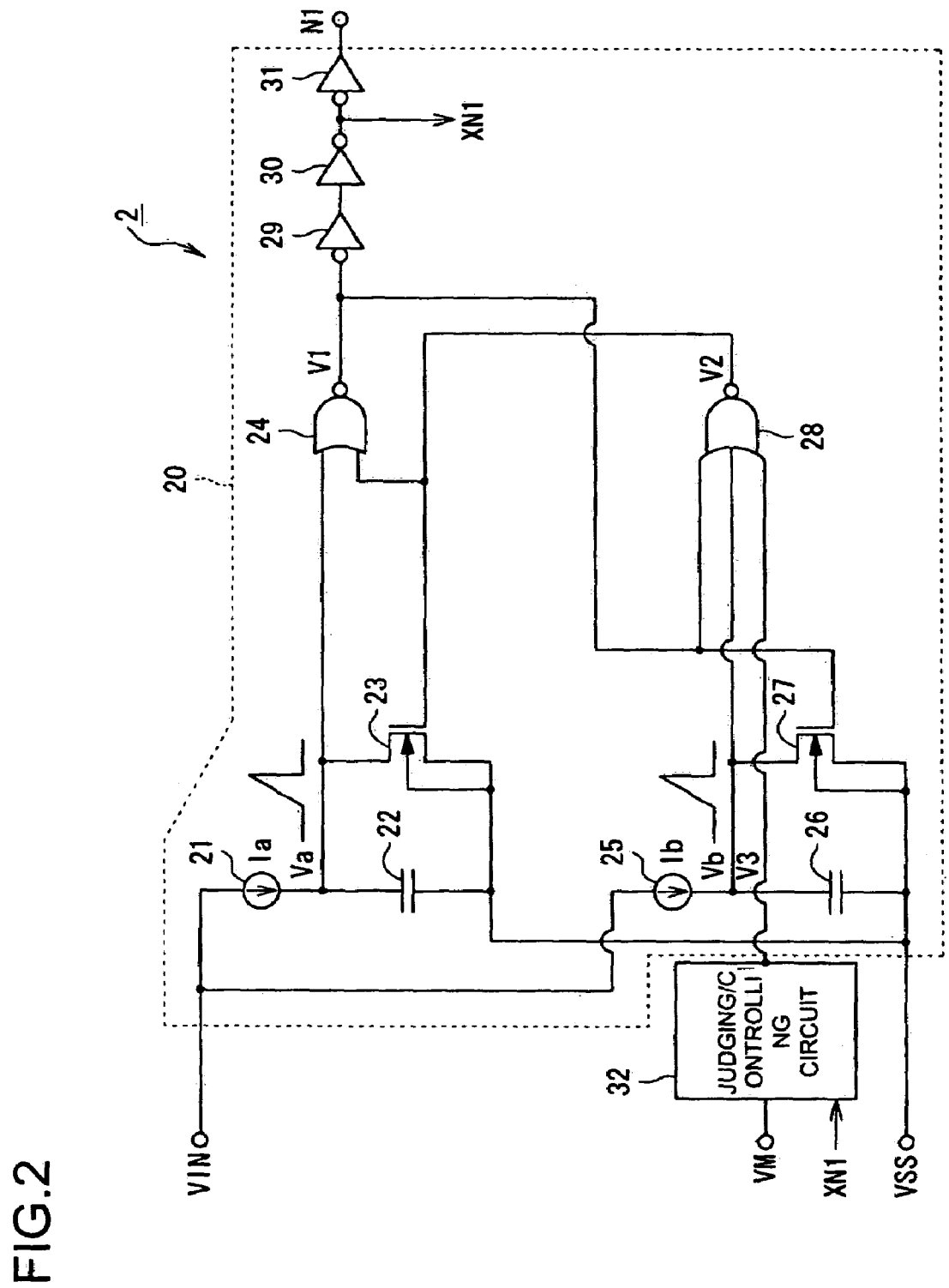
FIG. 2 is a circuit diagram showing a specific configuration of a starter circuit shown in FIG. 1.

To achieve the above, as shown in FIG. 2, the starter signal generation circuit 20 is composed of a constant current circuit 21, the capacitor 22, an N-type MOS transistor 23, a two-input NOR circuit 24, a constant current circuit 25, the capacitor 26, an N-type MOS transistor 27, a three-input NOR circuit 28, and three inverters 29, 30, and 31.

The constant current circuit 21 is for generating a constant current Ia and arranged to be driven by the input voltage VIN supplied from the direct current power source 4. The capacitor 22 is to be charged by the constant current Ia generated by the constant current circuit 21, and arranged to be charged while the MOS transistor 23 is in the off-state.

The MOS transistor 23 is a switching element connected in parallel with the capacitor 22, and arranged to be on/off controlled by an output voltage V2 of the NOR circuit 28 applied to the gate thereof. Accordingly, the capacitor 22 is charged by the constant current circuit 21 while the MOS transistor 23 is in the off-state, and discharged while the MOS transistor 23 is in the on-state.

The NOR circuit 24 is for implementing the logical nor operation of the charged voltage Va of the capacitor 22 and the output voltage V2 of the NOR circuit 28 to generate the output voltage V1 as a result of the operation. The output voltage V1 of the NOR circuit 24 is arranged to be supplied to each input of an inverter circuit 29, the gate of the MOS transistor 27, and an input of the NOR circuit 28.

The constant current circuit 25 is for generating a constant current Ib and arranged to be driven by the input voltage VIN supplied from the direct current power source 4. The capacitor 26 is to be charged by the constant current Ib generated by the constant current circuit 25, and arranged to be charged while the MOS transistor 27 is in the off-state.

The MOS transistor 27 is a switching element connected in parallel with the capacitor 26, and arranged to be on/off controlled by an output voltage V1 of the NOR circuit 24 applied to the gate thereof. Accordingly, the capacitor 26 is charged by the constant current circuit 25 while the MOS transistor 27 is in the off-state, and discharged while the MOS transistor 27 is in the on-state.

The NOR circuit 28 is arranged to implement the logical nor operation of the output voltage V1 of the NOR circuit 24, the charged voltage Vb of the capacitor 26, and the output voltage V3 of the determining/controlling circuit 32 to generate the output voltage V2 as a result of the operation. The output voltage V2 is arranged to be supplied to each gate of the MOS transistor 23 and an input of the NOR circuit 24.

The inverter circuits 29, 30, and 31 are for logically inverting the output voltage of the NOR circuit 24, and connected in series with each other. The output voltage XN1 of the inverter circuit 30 is supplied to the determining/controlling circuit 32 (See FIG. 3) while the output voltage of the inverter circuit 31 is taken out as the starter signal N1 of the starter circuit 2.

The determining/controlling circuit 32 is arranged to acquire a predetermined voltage in the boosting circuit 1 shown in FIG. 1, for example the voltage (hereinafter referred to as a monitor voltage VM) in a common connection section of the coil 5 and the diode 8, determine whether or not the monitor voltage VM exceeds a predetermined reference voltage, generate an output voltage V3 when the monitor voltage VM exceeds the reference voltage, and stop outputting the starter signal N1 from the starter signal generation circuit 20 to the MOS transistor 6 by supplying the output signal V3 to the NOR circuit 28.

Hereinafter, an example of a circuit more specifically implementing the starter circuit 2 shown in FIG. 2 is described with reference to FIG. 3.

Figure 3:
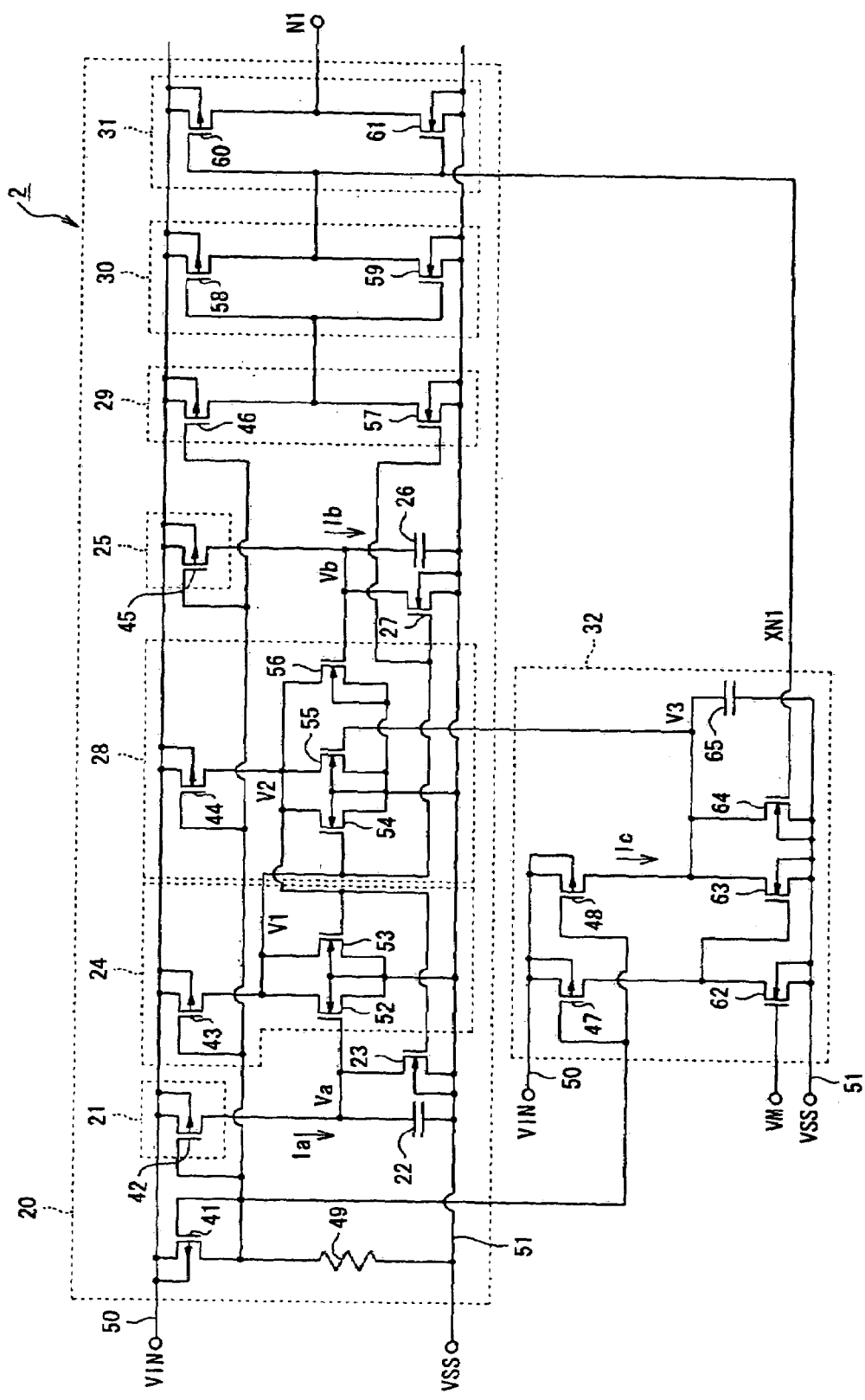
FIG. 3 is a circuit diagram showing a specific configuration of the transistor level of a starter circuit shown in FIG. 2.

As shown in FIG. 3, this starter circuit 2 is equipped with a current mirror circuit composed of P-type MOS transistors 41, 42, 43, 44, 45, 46, 47, and 48, and arranged to have a constant current determined by a resistor 49 for a constant current source to flow through the MOS transistor 41.

Namely, the MOS transistor 41 and the resistor 49 are serially connected, and this serial circuit is connected between a power line 50 supplied with the input voltage (the power source voltage) VIN and the ground line 51, and further the MOS transistor 41 forms the current mirror circuit with the MOS transistors 42, 43, 44, 45, 46, 47, and 48.

Accordingly, a predetermined current in accordance with the current flowing through the MOS transistor 41 flows through each of the MOS transistors 42, 43, 44, 45, 46, 47, and 48, which function as constant current circuits (constant current sources).

Note that the resistor 49 can be replaced with a MOS transistor with a predetermined bias voltage supplied to the gate thereof.

As shown in FIG. 3, the constant current circuit 21 is composed of the MOS transistor 42. The capacitor 22 is arranged to be charged by the current Ia flowing through the MOS transistor 42. The capacitor 22 is provided with the N-type MOS transistor 23 connected at both ends thereof for discharging the capacitor 22.

As shown in FIG. 3, the NOR circuit 24 is composed of N-type MOS transistors 52, 53, and the MOS transistor 43 forming the constant current circuit.

Specifically, the sources of the MOS transistors 52, 53 are commonly connected, and the commonly connected section is connected to the ground line 51. The gate of the MOS transistor 52 is arranged to be supplied with the charged voltage Va of the capacitor 22. The gate of the MOS transistor 53 is arranged to be supplied with the output voltage V2 of the NOR circuit 28. Further, the drains of the MOS transistors 52, 53 are commonly connected, and the commonly connected section is connected to the power line 50 via the MOS transistor 43, and further connected to each gate of the MOS transistor 54, the gate of the MOS transistor 27, and the gate of the MOS transistor 57.

As shown in FIG. 3, the constant current circuit 25 is composed of the MOS transistor 45. The capacitor 26 is arranged to be charged by the current Ib flowing through the MOS transistor 45. The capacitor 26 is provided with the N-type MOS transistor 27 connected at both ends thereof for discharging the capacitor 26.

As shown in FIG. 3, the NOR circuit 28 is composed of N-type MOS transistors 54, 55, 56 and the MOS transistor 44 forming the constant current circuit.

Specifically, the sources of the MOS transistors 54, 55, 56 are commonly connected, and the commonly connected section is connected to the ground line 51. The gate of the MOS transistor 54 is arranged to be supplied with the output voltage V1 of the NOR circuit 24. The gate of the MOS transistor 55 is arranged to be supplied with the output voltage V3 of the determining/controlling circuit 32. The gate of the MOS transistor 56 is arranged to be supplied with the charged voltage Vb of the capacitor 26. Further, the drains of the MOS transistors 54, 55, 56 are commonly connected, and the commonly connected section is connected to the power line 50 via the MOS transistor 44, and further connected to each gate of the MOS transistor 23 and the gate of the MOS transistor 53.

As shown in FIG. 3, the inverter circuit 29 is composed of the N-type MOS transistor 57 and the MOS transistor 46 forming the constant current circuit, and arranged to input the output voltage V1 of the NOR circuit 24 and then logically invert the same.

As shown in FIG. 3, the inverter circuit 30 includes a CMOS inverter circuit composed of the P-type MOS transistor 58 and the N-type MOS transistor 59, and arranged to logically invert the output voltage of the inverter circuit 29. The output voltage of the inverter circuit 30 is arranged to be supplied to the gate of the MOS transistor 64 forming the determining/controlling circuit 32.

As shown in FIG. 3, the inverter circuit 31 includes a CMOS inverter circuit composed of the P-type MOS transistor 60 and the N-type MOS transistor 61, and arranged to logically invert the output voltage of the inverter circuit 30. The output voltage of the inverter circuit 31 is arranged to be output as the starter signal Ni of the starter circuit 2, and supplied to the gate of the MOS transistor 6 of the boosting circuit 1 shown in FIG. 1.

As shown in FIG. 3, the determining/controlling circuit 32 is composed of N-type MOS transistors 62, 63, 64, the MOS transistor 47, 48 each forming the constant current circuit, and the capacitor 65.

The MOS transistor 62 is arranged to have the monitor voltage VM from the boosting circuit 1 input to the gate thereof, and to be switched to the on-state with the output voltage inverted from the H-level to the L-level when the monitor voltage VM exceeds the threshold voltage. In other words, the MOS transistor 62 compares the monitor voltage VM with the threshold voltage which is a predetermined reference voltage, and sets the output voltage to the L-level when the monitor voltage VM exceeds the reference voltage. The output voltage of the MOS transistor 62 is arranged to be supplied to the gate of the MOS transistor 63.

The MOS transistor 63 is a switching element on/off controlled by the voltage of the gate to which the output voltage of the MOS transistor 62 is input, and arranged to lead a current Ic flowing through the MOS transistor 48 to the ground line 51 during the on-state, and lead the current to the capacitor 65 to charge it during the off-state if the MOS transistor 64 is in the off-state.

To achieve the above, the MOS transistor 48 forming the constant current circuit and the MOS transistor 63 are serially connected, and this serial circuit is connected between the power line 50 and the ground line 51. Further, the capacitor 65 is connected to the MOS transistor 63 in parallel.

The capacitor 65 is arranged to be charged by the current Ic flowing through the MOS transistor 48. The charged voltage of the capacitor 65 is arranged to be supplied to the gate of the MOS transistor 55 of the NOR circuit 28 as the output voltage V3 of the determining/controlling circuit 32.

The MOS transistor 64 is a switching element for forcing the capacitor 65 to discharge. For this purpose, the MOS transistor 64 is connected to the capacitor 65 in parallel and arranged to have the output voltage XN1 of the inverter circuit 30 supplied to the gate thereof. Accordingly, the MOS transistor 64 is turned-on to discharge the capacitor 65 when the output voltage XN1 switches to the H-level.

Hereinafter, a summary of the operation of the embodiment configured as above is described with reference to FIGS. 1 and 4.

When the powered is turned on, the input voltage VIN from the direct current voltage source 4 is supplied to the boosting circuit 1 and the starter circuit 2. Then, when the input voltage VIN becomes, for example 0.9 V as shown in FIG. 4, the starter circuit 2 starts generating the starter signal N1, and the generated starter signal Nl is then supplied to the gate of the MOS transistor 6 of the boosting circuit 1. As a result, the boosting circuit 1 performs the boosting operation to gradually raise the output voltage VO thereof as shown in FIG. 4.

Then, as shown in FIG. 4, if the output voltage VO of the boosting circuit 1 becomes 1.5 V at the time t1, the drive circuit 3 starts its operation, and at the same time, the starter circuit 2 stops its operation.

Note that the output voltage VO of the boosting circuit 1 is detected by a suitable means, and each stopping control of the starter circuit 2 and the starting control of the drive circuit 3 is performed based on the detection result.

When the drive circuit 3 starts the operation as described above, the drive circuit 3 starts generating the drive signal N2, and the drive signal N2 thus generated is supplied to the gate of the MOS transistor 7 of the boosting circuit 1. As a result, the boosting circuit 1 performs the boosting operation to gradually raise the output voltage VO thereof until finally reaching a predetermined voltage as shown in FIG. 4.

Hereinafter, the operation of the starter circuit 2 according to the present embodiment is described with reference to FIGS. 2, 5, and 6.

First, in the starter circuit 2 shown in FIG. 2, the case in which only the starter signal generation circuit 20 operates is described.

As shown in FIG. 5A, before the time t1, if the charged voltage Va of the capacitor 22 is at the L-level, the MOS transistor 23 should be in the on-state, which requires the output voltage V2 of the NOR circuit 28 applied to the gate thereof to be at the H-level. In this case, since the charged voltage Va of the capacitor 22 and the output voltage V2 of the NOR circuit 28 are supplied to the NOR circuit 24, the output voltage V1 of the NOR circuit 24 becomes the L-level which is supplied to the gate of the MOS transistor 27 and the input of the NOR circuit 28.

Therefore, when the charged voltage Va of the capacitor 22 is at the L-level, the MOS transistor 27 becomes the off-state, which causes the charged voltage Vb of the capacitor 26 to gradually rise as shown in FIG. 5B. Further, in this case, since the output voltage V1 of the NOR circuit 24 is at the L-level, the starter signal N1 output from the inverter circuit 31 becomes the H-level as shown in FIG. 5C.

Thereafter, the charge of the capacitor 26 increases. When the charged voltage Vb of the capacitor 26 reaches the threshold voltage VT2 of the NOR circuit 28 at the time t1, the output voltage V2 of the NOR circuit 28 changes from the H-level to the L-level. Thus, the gate voltage of the MOS transistor 23 and the input voltage of the NOR circuit 24 change from the H-level to the L-level. As a result, the MOS transistor 23 changes from the on-state to the off-state, and the output voltage V1 of the NOR circuit 24 also changes from the L-level to the H-level, which turns-on the MOS transistor 27.

Therefore, at the time t1, the capacitor 22 starts charging to gradually increase the charged voltage Va as shown in FIG. 5A. Further, the starter signal N1 output from the inverter circuit 31 changes from the H-level to the L-level as shown in FIG. 5C. Still further, the capacitor 26 is discharged, and the charged voltage Vb thereof is rapidly reduced to 0 V as shown in FIG. 5B.

Thereafter, the charge of the capacitor 22 increases. When the charged voltage Va of the capacitor 22 reaches. the threshold voltage VT1 of the NOR circuit 24 at the time t2 as shown in FIG. 5A, the output voltage V1 of the NOR circuit 24 changes from the H-level to the L-level. Thus, the gate voltage of the MOS transistor 27 and the input voltage of the NOR circuit 28 change from the H-level to the L-level. As a result, the MOS transistor 27 changes from the on-state to the off-state, and the output voltage V2 of the NOR circuit 28 also changes from the L-level to the H-level, which turns-on the MOS transistor 23.

Therefore, at the time t2, the capacitor 26 starts charging to gradually increase the charged voltage Vb as shown in FIG. 5B. Further, the starter signal N1 output from the inverter circuit 31 changes from the L-level to the H-level as shown in FIG. 5C. Still further, the capacitor 22 is discharged, and the charged voltage Va thereof is rapidly reduced to 0 V as shown in FIG. 5A.

Thereafter, since the series of operations as described above are repeated, the starter signal Ni output from the inverter circuit 31 appears as shown in FIG. 5C.

As a summary of the above operations, the starter signal generation circuit 20 in the starter circuit 2 generates the starter signal N1 by alternately charging the capacitors 22, 26 as shown in FIG. 5. The oscillation frequency of the starter signal N1 can be controlled by controlling each constant current Ia, lb of the constant current circuit 21, 25.

Further, the wave heights of the charged voltage Va, Vb of the capacitors 22, 26 are determined by the threshold voltages of the NOR circuits 24, 28, respectively. Still further, the gradient dV/dT of the rising edges of the charged voltages Va, Vb is given as dV/dT =I/C. Therefore, the gradient is determined by the values of the constant currents Ia, Ib in the constant current circuits 21, 25 and the capacitances of the capacitors 22, 26.

Accordingly, if the values of the constant current Ia, Ib of the constant current circuits 21, 25 are equal, and the capacitances of the capacitors 22, 26 are equal, the starter signal N1 becomes a clock signal having a duty ratio of 50% (See FIG. 5).

In contrast, if the capacity of the capacitor 22 is set to be greater than the capacity of the capacitor 26, the charged voltage Va, Vb appear as shown in FIGS. 6A and 6B. As a result, the starter signal N1 appears as shown in FIG. 6C, which has a duty ratio changed from that shown in FIG. 5C. Note that the starter signal N1 swings between the input voltage VIN and the ground voltage VSS.

Also, the duty ratio of the starter signal N1 can be changed by changing the capacity ratio of the capacitor 22 to the capacitor 26. Further, if the frequency thereof is set to be higher by adjusting the constant currents Ia, Ib of the constant current circuits 21, 25, the duty ratio does not change.

Therefore, the characteristics thereof can be effectively utilized to PWM circuits for boosting switching regulators. In boosting switching regulator circuits, in general, the maximum duty ratios of the switching clocks are regulated (e.g., the maximum duty ratio of 80%). In the starter signal generation circuit 20, the maximum duty ratio can be realized by adjusting the capacity ratio of the capacitors 22, 26.

Hereinafter, the operation of the starter circuit 2 shown in FIG. 3 is described. But first, a problem caused in the boosting circuit 1 if the determining/controlling circuit 32 shown in FIG. 3 is NOT implemented is described with reference to FIGS. 7A, 7B, and 7C.

In this case, the starter signal N1 as shown in FIG. 7A is input to the gate of the MOS transistor 6 of the boosting circuit 1 to on/off control the MOS transistor 6. Thus, the monitor voltage VM at the common connection point of the coil 5 and the diode 8 appears as shown in FIG. 7B.

In this case, assuming that the level of the input signal VIN to the boosting circuit 1 is around 0.9 V, the MOS transistor 6 itself can easily be saturated because of the large on-resistance of the MOS transistor 6, which makes, for example, the current I flowing through the MOS transistor 6 to be as shown in FIG. 7C.

Namely, since the current I flowing through the MOS transistor 6 is equal to the current flowing through the coil 5, the energy stored in the coil 5 in the form of an inductance L makes $(\frac{1}{2})LI^2$. Therefore, if the current I cannot be increased due to the saturation of the MOS transistor 6, the current I allowed to flow thereafter by keeping the MOS transistor 6 in the on-state cannot contribute to storing energy in the coil 5, and accordingly, the current I flowing in the period T1 shown in FIG. 7C can be regarded as wasteful current consumption.

Therefore, in the present embodiment, in order to solve the above problem, the starter circuit 2 is arranged to be equipped with the determining/controlling circuit 32 shown in FIG. 3 in addition to the starter signal generation circuit 20.

Namely, the determining/controlling circuit 32 is equipped with the MOS transistor 62 having a gate provided with the monitor voltage VM (See FIG. 8B), and arranged to change the starter signal N1 generated by the starter signal generation circuit 20 from the H-level to the L-level as shown in FIG. 8A when the monitor voltage VM exceeds the threshold voltage of the MOS transistor 62. That is, the on-period of the starter signal N1 is arranged to be shorter than the predetermined value.

As a result, since the MOS transistor 6 of the boosting circuit 1 is switched from the on-state to the off-state to make the current I flowing through the MOS transistor 6 to be as shown in FIG. 8C, the wasteful current consumption as shown in FIG. 7C can be prevented to realize lower current consumption at the starting period of the boosting circuit 1.

Hereinafter, the operation of the starter circuit 2 shown in FIG. 3 is described with reference to FIGS. 9A through 9F.

Since the operation of the starter signal generation circuit 20 shown in FIG. 3 is the same as the operation of the starter signal generation circuit 20 shown in FIG. 2, the operation of the determining/controlling circuit 32 is described with the simplest description of the operation of the starter signal generation circuit 20.

FIGS. 9A through 9F show waveforms of various sections of the starter circuit 2 shown in FIG. 3 when the current I flowing through the MOS transistor 6 of the boosting circuit 1 is not saturated and when the current I is saturated.

First, the case in which the current I flowing through the MOS transistor 6 of the boosting circuit 1 is not saturated is described with reference to the left portions of FIGS. 9A through 9F.

When the starter signal N1 generated by the starter signal generation circuit 20 changes from the L-level to the H-level at time t1 as shown in FIG. 9C, the MOS transistor 6 shown in FIG. 1 changes from the off-state to the on-state. Thus, the current I flows through the MOS transistor 6 while storing energy in the coil 5. In this case, since the current flowing through the MOS transistor 6 is not saturated, the monitor voltage VM of the boosting circuit 1 input to the gate of the MOS transistor 6 is increasing from time t1 to time t2 as shown in FIG. 9E.

As a result, in the period from the time t1 to the time t2, the monitor voltage VM is held below the threshold voltage of the MOS transistor 62, and accordingly, the MOS transistor 63-is in the off-state with an output voltage of the H-level. Accordingly, the MOS transistor 63 is set to the on-state inhibiting the capacitor 65 to be charged by the constant current Ic supplied from the MOS transistor 48, which keeps the charged voltage V3 of the capacitor 65 to 0 V as shown in FIG. 9F. Further, since the output voltage XN1 of the inverter circuit 30 is held in the L-level in the period from the time t1 to the time t2, the MOS transistor 64 is set to the off-state.

As is apparent from the above, when the current I flowing through the MOS transistor 6 of the boosting circuit 1 is not saturated, the starter signal Ni generated by the starter signal generation circuit 20 is not controlled by the determining/controlling circuit 32.

Now, the case in which the current I flowing through the MOS transistor 6 of the boosting circuit 1 is saturated is described with reference to the right portions of FIGS. 9A through 9F.

When the starter signal N1 generated by the starter signal generation circuit 20 changes from the L-level to the H-level at time t3 as shown in FIG. 9C, the MOS transistor 6 shown in FIG. 1 changes from the off-state to the on-state. Thus, the current I flows through the MOS transistor 6 while storing energy in the coil 5. Further, the monitor voltage VM of the boosting circuit 1 starts rising at time t3 as shown in FIG. 9E.

When the monitor voltage VM of the boosting circuit reaches the threshold voltage Vth of the MOS transistor 62 at time t4, the MOS transistor 62 is switched to the on-state with an output voltage of the L-level. Accordingly, the MOS transistor 63 is switched to the off-state, and the MOS transistor 64 is also switched off because, in this case, the output voltage XN1 of the inverter circuit 30 is in the L-level as shown in FIG. 9D.

Therefore, since the capacitor 65 is charged-by the constant current Ic supplied from the MOS transistor 48, the charged voltage V3 of the capacitor 65 rises rapidly as shown in FIG. 9F. Then, when the charged voltage V3 exceeds the threshold voltage Vth of the NOR circuit 28 at time t5, the output voltage V2 of the NOR circuit 28 changes from the H-level to the L-level, and further, the output voltage V1 of the NOR circuit 24 changes from the L-level to the H-level. As a result, the starter signal N1 changes from the H-level to the L-level at time t6, and the MOS transistor 6 changes from the on-state to the off-state to prevent the wasteful current from flowing through the MOS transistor 6.

As is apparent from the above, when the current I flowing through the MOS transistor 6 of the boosting circuit 1 is saturated, the starter signal N1 generated by the starter signal generation circuit 20 is controlled to be shortened by the determining/controlling circuit 32.

Further, although the off-period of the starter signal N1 generated by the starter signal generation circuit 20 shown in FIG. 3 is fixed, according to such an operation of the determining/controlling circuit 32 as described above, the on-period of the starter signal N1 can be shortened to increase the switching frequency of the MOS transistor 6. In particular, in case the input voltage VIN of the boosting circuit 1 is rather low resulting in less energy stored in the coil 5, it becomes possible to make the output voltage rise rapidly when starting-up the boosting circuit 1 by increasing the switching frequency as described above.

Hereinafter, a first modified example of the embodiment of the present invention is described with reference to FIG. 10.

Figure 10:
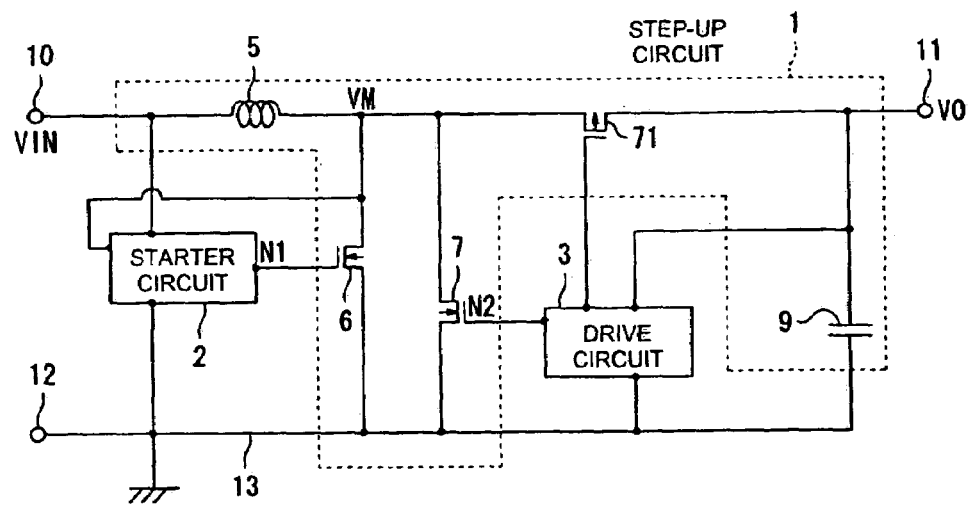
FIG. 10 is a circuit diagram showing a configuration of a first modified example of an embodiment according to the present invention.

In the first modified example, as shown in FIG. 10, the diode 8 of the embodiment shown in FIG. 1 is replaced with the MOS transistor 71 which is arranged to be on/off controlled by the drive circuit 3. Since the configuration of the other portions of the first modified example is the same as the configuration of the embodiment shown in FIG. 1, the same elements are denoted with the same reference numerals, and descriptions thereof are omitted.

Figure 11:
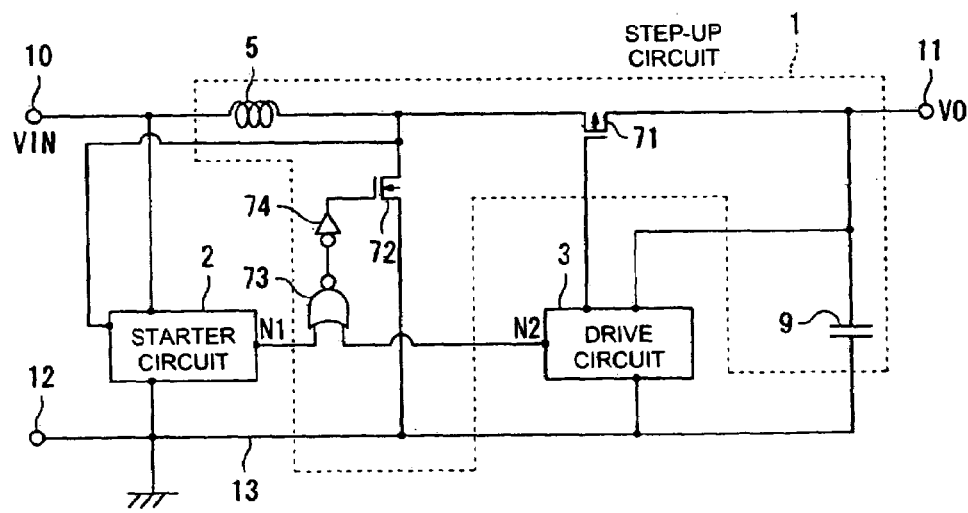
FIG. 11 is a circuit diagram showing a configuration of a second modified example of an embodiment according to the present invention.

Hereinafter, a second modified example 6f the embodiment of the present invention is described with reference to FIG. 11.

In the first modified example shown in FIG. 10, the boosting circuit 1 is equipped with the MOS transistor 6 started by the starter circuit 2 and the MOS transistor 7 driven by the drive circuit 3.

In contrast, in the second modified example, both of the MOS transistors 6, 7 are arranged into one MOS transistor 72, and a two-input NOR circuit 73 and an inverter 74 are added. The starter signal N1 from the starter circuit 2 and the drive signal N2 from the drive circuit 3 are supplied to the input side of the NOR circuit 73, and the output of the NOR circuit 73 is-supplied to the gate of the MOS transistor 72 via the inverter circuit 74.

Since the configuration of other portions of the second modified example is the same as the configuration of the first modified example shown in FIG. 10, the same elements are denoted with the same reference numerals, and descriptions thereof are omitted.

Hereinafter, a modified example of the starter circuit of the embodiment according to the present invention is described with reference to FIG. 12.

Figure 12:
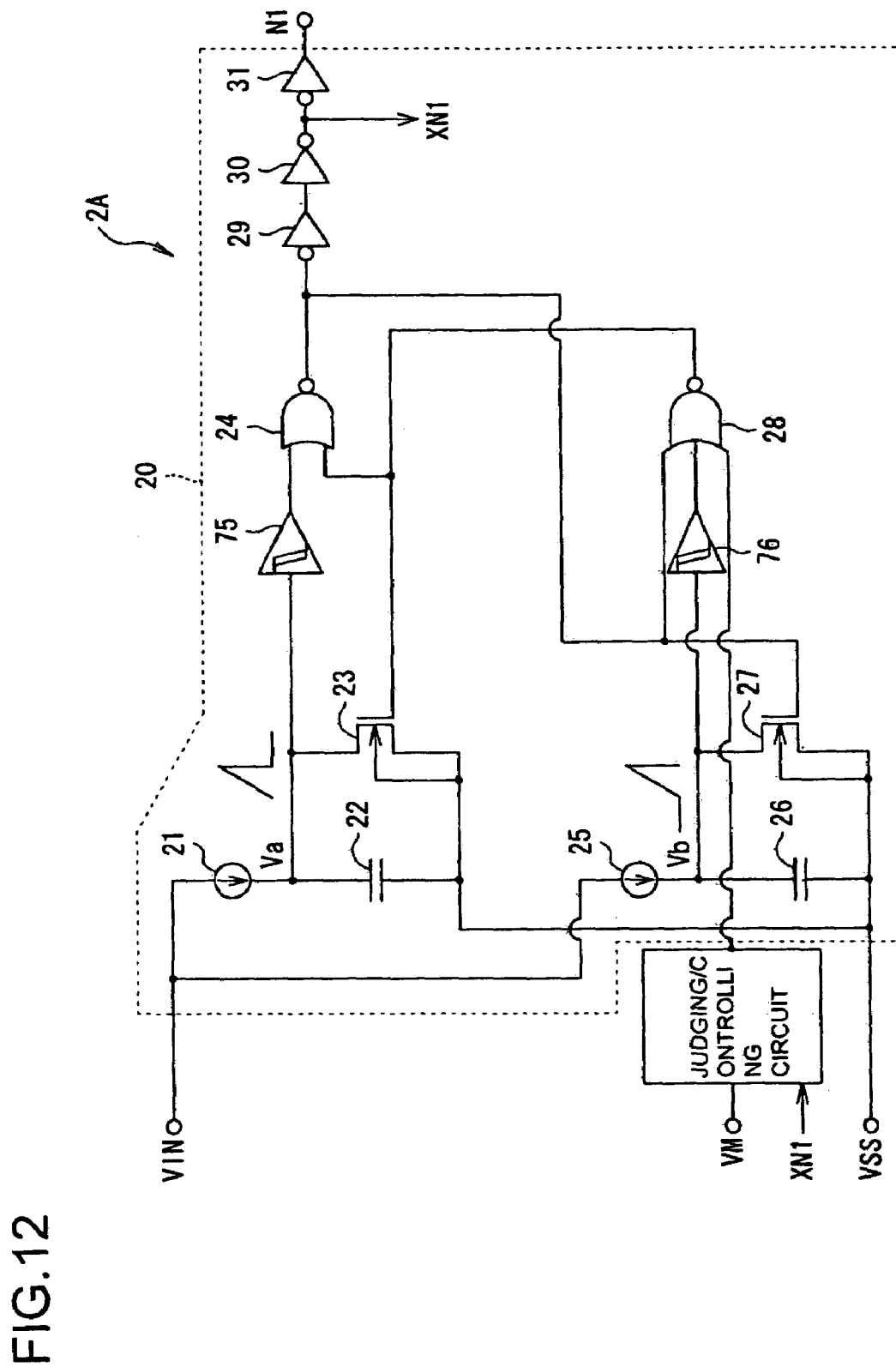
FIG. 12 is a circuit diagram showing a configuration of a modified example of the starter circuit.

A starter circuit 2A shown in FIG. 12 is configured by adding to the configuration of the starter circuit 2 shown in FIG. 2 as the base a Schmitt trigger circuit 75 through which the charged voltage Va of the capacitor 22 is input to the NOR circuit 24 and a Schmitt trigger circuit 76 through which the charged voltage Vb of the capacitor 26 is input to the NOR circuit 28. By adding the Schmitt trigger circuits 75 and 76 as described above, the operation can be stabilized.

Note that, since the configuration of other portions of the starter circuit 2A is the same as the configuration of the starter circuit 2 shown in FIG. 2, the same elements are denoted with the same reference numerals, and descriptions thereof are omitted.

What is claimed is:

1. A power source device comprising:
    a boosting circuit for stepping-up an input voltage to a desired output voltage;
    a starter circuit for starting the boosting circuit in a starting period of the boosting circuit;
    a drive circuit for driving the boosting circuit as a substitute for the starter circuit;
    a voltage source for providing an input voltage to the boosting circuit and the starter circuit; and
    a switching element associated with the boosting circuit for switching from the boosting circuit to the drive circuit when the output voltage of the boosting circuit reaches a predetermined level;
    wherein the starter circuit is arranged to on/off control the switching element when a predetermined monitor voltage generated in the boosting circuit reaches a predetermined level.

2. A power source device comprising:
    a boosting circuit for stepping-up an input voltage to a desired output voltage;
    a starter circuit for starting the boosting circuit in a starting period of the boosting circuit; and
    a drive circuit for driving the boosting circuit as a substitute for the starter circuit;
    a switching element associated with the boosting circuit for switching from the starter circuit to the drive circuit when the output voltage of the boosting circuit reaches a predetermined level;
    wherein the starter circuit includes:
        a starter signal generator which generates a starter signal for on/off controlling the switching element; and
        a determining/controlling circuit which determines if a monitor voltage generated in the boosting circuit reaches a predetermined level; and
    wherein when the monitor voltage reaches the predetermined level, the determining/controlling circuit provides an output signal to the starter signal generator circuit which provides an output signal to the switching element to change from the boosting circuit to the drive circuit.

3. The power source device according to claim 2, wherein the starter signal generator comprises two constant current circuits and two capacitors alternately charged by respective constant current circuits, and a frequency of the starter signal is arranged to be controlled by altering constant current values of both constant current circuits, and a duty ratio of the starter signal is arranged to be controlled by altering capacitances of both capacitors.

* * * * *